US010585471B2

(12) United States Patent
Reichow et al.

(10) Patent No.: US 10,585,471 B2
(45) Date of Patent: Mar. 10, 2020

(54) SYSTEMS AND METHODS TO PROVIDE AN INTERACTIVE SPACE BASED ON PREDICTED EVENTS

(71) Applicant: Disney Enterprises, Inc., Burbank, CA (US)

(72) Inventors: Mark A. Reichow, Valencia, CA (US); Kameron Burk, Los Angeles, CA (US); Gary R. Marshall, Sherman Oaks, CA (US); Michael P. Goslin, Los Angeles, CA (US); Jonathan M. Ackley, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 195 days.

(21) Appl. No.: 15/723,973

(22) Filed: Oct. 3, 2017

(65) Prior Publication Data
US 2019/0101976 A1    Apr. 4, 2019

(51) Int. Cl.
| | | |
|---|---|---|
| G06F 3/01 | (2006.01) | |
| B60W 50/00 | (2006.01) | |
| B60W 50/14 | (2020.01) | |
| G01S 17/89 | (2020.01) | |
| G01S 17/93 | (2020.01) | |
| G01C 21/00 | (2006.01) | |
| G01S 17/931 | (2020.01) | |

(52) U.S. Cl.
CPC .......... *G06F 3/011* (2013.01); *B60W 50/0097* (2013.01); *B60W 50/14* (2013.01); *G01C 21/00* (2013.01); *G01S 17/89* (2013.01); *G01S 17/931* (2020.01)

(58) Field of Classification Search
CPC ........ G01S 17/936; G01S 17/89; G06F 3/011; B60W 50/0097; B60W 50/14; G01C 21/00
See application file for complete search history.

(56) References Cited

U.S. PATENT DOCUMENTS

| 1,004,331 A | 9/1911 | Wright |
|---|---|---|
| 1,004,624 A | 10/1911 | Brann |
| 6,053,815 A | 4/2000 | Hara |

(Continued)

FOREIGN PATENT DOCUMENTS

WO    2018128946 A1    7/2018

OTHER PUBLICATIONS

Adam Hartley, 5 Predictions for the Future of in-Car Entertainment, Apr. 9, 2019 [https://360.here.com/5-predictions-for-the-future-of-in-car-leisure-entertainment], (5 pages).

(Continued)

*Primary Examiner* — Mussa A Shaawat
(74) *Attorney, Agent, or Firm* — Esplin & Associates, PC (57) ABSTRACT

This disclosure relates to systems and methods to provide an interactive space based on events likely to occur. A system may be coupled to a vehicle. The events likely to occur may be predicted based on motion of the vehicle and/or other information. Content may be presented to the user. The predicted events may be used as a basis for adjusting the content. This may allow the motion of the vehicle and/or the predicted events to form a part of a user's experience with the interactive space. The users may feel more immersed in the experiences as the vehicle moves.

17 Claims, 4 Drawing Sheets

(56) References Cited

U.S. PATENT DOCUMENTS

| | | | |
|---|---|---|---|
| 6,200,138 B1 | 3/2001 | Ando | |
| 6,691,032 B1 | 2/2004 | Irish | |
| 7,837,544 B2 | 11/2010 | Tipping | |
| 8,190,295 B1* | 5/2012 | Garretson | G05D 1/0038 700/245 |
| 8,758,126 B2 | 6/2014 | Bavitz | |
| 8,941,690 B2 | 1/2015 | Seder | |
| 8,988,465 B2 | 3/2015 | Baron | |
| 9,007,400 B2 | 4/2015 | Takahashi | |
| 9,266,018 B2 | 2/2016 | Story | |
| 9,293,042 B1 | 3/2016 | Wasserman | |
| 9,327,189 B2 | 5/2016 | Bavitz | |
| 9,361,730 B2 | 6/2016 | Keating | |
| 9,610,510 B2 | 4/2017 | Comploi | |
| 9,643,086 B2 | 5/2017 | Tipping | |
| 9,669,302 B2 | 6/2017 | Park | |
| 9,715,764 B2 | 7/2017 | Alaniz | |
| 9,744,448 B2 | 8/2017 | Mullen | |
| 9,814,991 B2 | 11/2017 | Van Winkle | |
| 9,821,920 B2 | 11/2017 | Cole | |
| 9,922,466 B2 | 3/2018 | Donnelly | |
| 1,001,907 A1 | 7/2018 | Szczerba | |
| 10,025,431 B2 | 7/2018 | Li | |
| 1,005,934 A1 | 8/2018 | Thieberger-Navon | |
| 10,140,464 B2 | 11/2018 | Lebeck | |
| 10,162,998 B2 | 12/2018 | Park | |
| 10,310,600 B2 | 6/2019 | Hong | |
| 10,339,711 B2 | 7/2019 | Ng-Thow-Hing | |
| 10,366,290 B2* | 7/2019 | Wang | G06K 9/00671 |
| 2003/0130031 A1 | 7/2003 | Yoshida | |
| 2008/0311983 A1 | 12/2008 | Koempel | |
| 2009/0079705 A1 | 3/2009 | Sizelove | |
| 2010/0130296 A1 | 5/2010 | Ackley | |
| 2010/0182340 A1 | 7/2010 | Bachelder | |
| 2010/0331721 A1 | 12/2010 | Epley | |
| 2011/0216948 A1 | 9/2011 | Yalla | |
| 2012/0089275 A1 | 4/2012 | Yao-Chang | |
| 2012/0142415 A1 | 6/2012 | Lindsay | |
| 2012/0256945 A1 | 10/2012 | Kidron | |
| 2012/0264518 A1 | 10/2012 | Rouille | |
| 2013/0083003 A1 | 4/2013 | Perez | |
| 2013/0083061 A1 | 4/2013 | Mishra | |
| 2013/0166147 A1 | 6/2013 | Chudzinski | |
| 2013/0274024 A1 | 10/2013 | Geylik | |
| 2014/0067208 A1 | 3/2014 | Klappert | |
| 2014/0128144 A1 | 5/2014 | Bavitz | |
| 2014/0128145 A1 | 5/2014 | Hwang | |
| 2014/0295963 A1 | 10/2014 | Ishikawa | |
| 2014/0342790 A1 | 11/2014 | Kim | |
| 2015/0065237 A1 | 3/2015 | Hohn | |
| 2015/0097864 A1 | 4/2015 | Alaniz | |
| 2015/0202962 A1 | 7/2015 | Habashima | |
| 2015/0294505 A1 | 10/2015 | Atsmon | |
| 2015/0346722 A1 | 12/2015 | Herz | |
| 2016/0096114 A1 | 4/2016 | Van Winkle | |
| 2016/0199730 A1 | 7/2016 | Olson | |
| 2016/0206955 A1 | 7/2016 | Goslin | |
| 2016/0206957 A1 | 7/2016 | Goslin | |
| 2016/0299567 A1 | 10/2016 | Crisler | |
| 2016/0313792 A1 | 10/2016 | Siegel | |
| 2016/0346704 A1 | 12/2016 | Wagner | |
| 2017/0021273 A1 | 1/2017 | Rios | |
| 2017/0021282 A1 | 1/2017 | Comploi | |
| 2017/0045946 A1 | 2/2017 | Smoot | |
| 2017/0050743 A1 | 2/2017 | Cole | |
| 2017/0068311 A1 | 3/2017 | Evans | |
| 2017/0072316 A1 | 3/2017 | Finfter | |
| 2017/0103571 A1 | 4/2017 | Beaurepaire | |
| 2017/0132334 A1 | 5/2017 | Levinson | |
| 2017/0166221 A1 | 6/2017 | Osterman | |
| 2017/0330034 A1* | 11/2017 | Wang | G05D 1/0088 |
| 2018/0040162 A1* | 2/2018 | Donnelly | G06T 19/006 |
| 2018/0040163 A1* | 2/2018 | Donnelly | G06F 3/012 |
| 2018/0043272 A1 | 2/2018 | Van Winkle | |
| 2018/0089901 A1 | 3/2018 | Rober | |
| 2018/0231973 A1* | 8/2018 | Mattingly | G05D 1/0044 |
| 2019/0065970 A1* | 2/2019 | Bonutti | G08B 31/00 |
| 2019/0220674 A1 | 7/2019 | Khalfan | |

OTHER PUBLICATIONS

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/document/7422403] (8 pages).

Raman Mehta, IDG Communications, Inc., Augmented Reality— Next Frontier for Competitive Advantage, Feb. 14, 2017 [https://www.cio.com/article/3169685/augmented-reality-next-frontier-for-competitive-advantage.html], (5 pages).

* cited by examiner

SYSTEMS AND METHODS TO PROVIDE AN INTERACTIVE SPACE BASED ON PREDICTED EVENTS

FIELD

This disclosure relates to systems and methods to provide an interactive space based on predicted events.

BACKGROUND

Some vehicles include sensors and processing components to detect and/or predict vehicle events. For example, Light Detection and Ranging (lidar) systems have been used for research in various self-driving vehicle programs. Lidar uses laser pulses to take measurements and generate a 3D map of an environment. After the unit sends out a laser pulse, a sensor on the instrument measures the amount of time it takes for the pulse to bounce back. As light moves at a constant speed, the lidar unit is able to accurately calculate the distance between itself and the target. Some vehicles may use monocular cameras around the perimeter of the vehicle combined with radar to get 3D ranging. Some vehicles may use stereo cameras to get both image data and ranging data from just cameras. Using environmental and biometric indicators, cars may prepare themselves for an upcoming task the driver already has in mind, e.g., slowing down to ready for a turn, or changing lanes in anticipation of a highway exit. Vehicles may be "connected" with other vehicles and even the highways they travel. Vehicle-to-vehicle communication may allow cars to communicate with each other over a dedicated Wi-Fi band and share information about vehicle speed, direction of travel, traffic flow, and road and weather conditions. Advanced Driver Assistance Systems (ADAS) have been utilized to make driving safer. These systems prepare vehicles for unsafe road conditions and alert drivers if they perform a dangerous maneuver.

SUMMARY

This disclosure relates to systems and methods to provide an interactive space based on predicted events. An interactive space may include one or both of an augmented reality (AR) environment, a virtual reality (VR) environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

The system may be at least partially coupled to, or included in, a vehicle. The vehicle may be configured to freely traverse over a terrain. For example, the vehicle may not be coupled to a rail and/or track. The vehicle may include a passenger vehicle and/or other vehicle configured to transport people. The passenger vehicle may be self-propelled (e.g., a sedan, a truck, a bus, and/or other vehicles), attached to an engine (e.g., a train, trolley, tug or similar vehicle), or may be coasting or ballistic (e.g., an orbiting, falling or coasting vehicle).

A system configured to provide an interactive space based on predicted events may include one or more of one or more physical processors, a client device, one or more vehicle sensors, and/or other components. The client device may be configured to be installed on a head of a user. The client device may be configured to present visual content to the user of the client device. The visual content may be in the form of images of virtual content.

In some implementations, the one or more processors may be configured by machine-readable instructions. The machine-readable instructions may include one or more computer program components. The computer program components may include one or more of an experience component, a synchronization component, a ride component, a prediction component, a trigger component, and/or other components.

The experience component may be configured to obtain experience information. The experience information may define the visual content to be presented to the user residing in the vehicle to create an interactive space. The experience component may be configured to effectuate presentation of the visual content on the client device.

The synchronization component may be configured to determine a position and/or heading of the client device. The position and/or heading of the client device may characterize a viewpoint of the user of the client device.

The synchronization component may be configured to synchronize the presentation of the visual content on the client device based on the position and/or heading of the client device. The synchronization may cause the presentation of the visual content to change as the viewpoint of the user changes.

The ride component may be configured to obtain output signals generated by the one or more vehicle sensors. The output signals may convey ride information and/or other information. The ride information may characterize one or more of movement, operation, and/or context of the vehicle.

The prediction component may be configured to predict events likely to occur based on the ride information and/or other information.

The trigger component may be configured to trigger adjustments to the visual content at individual occurrences of individual predicted events.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. The drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
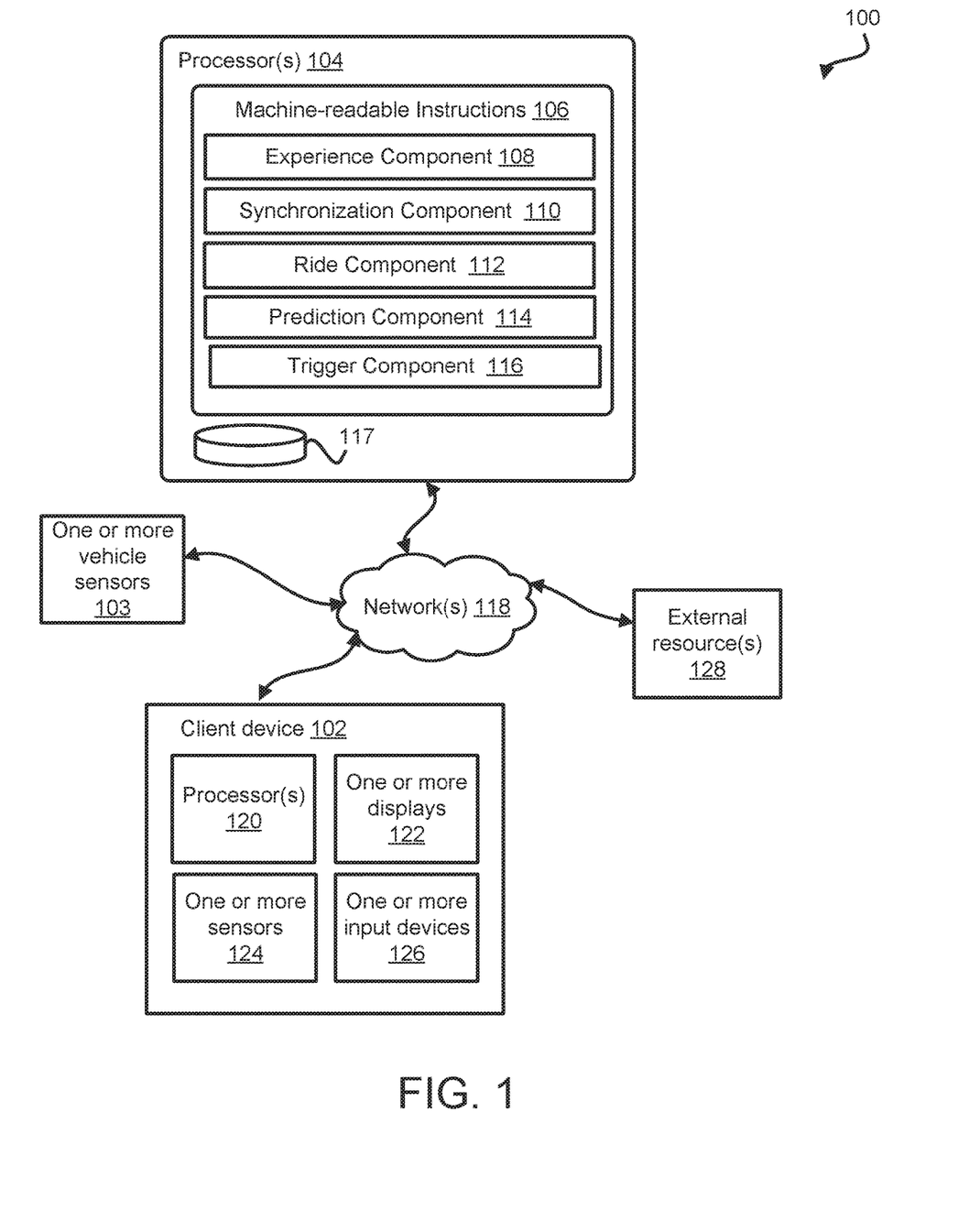
FIG. 1 illustrates a system configured to provide an interactive space based on predicted events, in accordance with one or more implementations.

FIG. 1 illustrates a system 100 configured to provide an interactive space based on predicted events. The system 100 may be at least partially coupled to, or included in, a vehicle (not shown in FIG. 1). The vehicle may be configured to freely traverse over a terrain. For example, the vehicle may not be coupled to a rail and/or track. The vehicle may include a passenger vehicle. The passenger vehicle may be self-propelled (e.g., a sedan, a truck, a bus, and/or other vehicles), attached to an engine (e.g., a train, trolley, tug or similar vehicle), or may be coasting or ballistic (e.g., an orbiting, falling or coasting vehicle).

An interactive space may include one or more of an augmented reality (AR) environment, a virtual reality (VR) environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

An interactive space may include various content. Such content may include one or more of visual content, audio content, haptic content, and/or other content. The visual content may be in the form of images of virtual content. The virtual content may include one or more of a simulated space, virtual objects present in and/or moving through the simulated space, and/or other virtual content. Virtual content may be thematically, semantically, informationally, or otherwise correlated with objects in the real world. Alternatively or in addition the virtual content may amplify, mute, or extend the objects in the real world, or may replace or occlude objects in the real world.

The content of the interactive space may be associated with one or more experience types. The one or more experience types may include one or more of a narrative-type experience for telling stories, a game-type experiences for gameplay, and/or other types of experiences. The content of the interactive space may be adjusted based on events likely to occur. The events likely to occur may be predicted based on motion of the vehicle and/or other information. The use of the predicted events as a basis for adjusting the content may allow the motion of the vehicle and/or the predicted events to form a part of a user's experience with the interactive space. The users may feel more immersed in the experiences as the vehicle moves.

The system 100 may include one or more of a client device 102, one or more vehicle sensors 103, one or more physical processors 104, and/or other components. Some or all components of system 100 may be installed in a vehicle and/or otherwise coupled with a vehicle (not shown in FIG. 1). Some or all components of system 100 may be worn by a person in a vehicle. Some or all of components of system 100 may be installed in a device worn by a person in a vehicle and/or be otherwise coupled with a device worn by a person in a vehicle. By way of non-limiting illustration, client device 102 may be configured to be worn on a head of a person in the vehicle.

In some implementations, one or more physical processors 104 may be included in client device 102. For example, client device 102 may include one or more physical processor 120 that may be the same as or similar to one or more physical processors 104.

The one or more vehicle sensors 103 may be installed in a vehicle and/or be otherwise coupled with a vehicle. The one or more vehicle sensors 103 may be configured to generate output signals conveying ride information and/or other information. The ride information may characterize one or more of movement, operation, and/or context of the vehicle. In some implementations, ride information may be determined from other sources (e.g., external resource(s) 128).

The one or more vehicle sensors 103 may include one or more of image sensors (e.g., monocular and/or stereo cameras), temperature sensors, vehicle speed sensors, wheel speed sensors, motion sensors (e.g., detect and/or recognize motion in and/or outside the vehicle), accelerometers, tilt sensors, inclination sensors, angular rate sensors, gyroscopes, navigation sensors, geolocation sensors, magnetometers, radar detectors, radar sensors, proximity sensors, range sensors (e.g., lidar and/or other range sensors), vibration sensors, light detection sensors, engine control module sensors, biometric sensors, Advanced Driver Assistance Systems (ADAS), External sensors on traffic controlled intersections (cameras, etc.), audio sensors (e.g. to detect sound outside and/or inside vehicle), weather sensors, light sensors, and/or other sensors.

In some implementations, one or more vehicle sensors 103 may be installed in a vehicle and/or be otherwise coupled to a vehicle. In some implementations, one or more vehicle sensors 103 may be worn and/or held by a person in a vehicle. By way of non-limiting illustration, biometric sensors may include one or more of a heartbeat sensor, electroencephalography (EEG) sensor, and/or other sensors configured to be worn and/or held by an individual. In some implementations, one or more vehicle sensors 103 may be installed in or otherwise coupled to client device 102.

In some implementations, ride information may include one or more of motion information, activity information, trip progress information, environment information, caravanning information, and/or other information characterizing one or more of movement, operation, and/or context of the vehicle.

Motion information may characterize movement of a vehicle and/or other aspects of the vehicle. Movement may be characterized at a given time, over a duration of time, at a location, and/or over a distance. Motion information may include one or more information describing whether the vehicle is moving forward, moving backwards, moving right, moving left, moving up, moving down, accelerating in a direction and/or angle, decelerating in a direction and/or angle, and/or other aspects of vehicle movement. In some implementations, one or more vehicle sensors 103 that may generate output signals conveying motion information may include one or more of a vehicle speed sensor, a wheel speed sensor, a motion sensor, an accelerometer, a tilt sensor, an inclination sensor, an angular rate sensor, a gyroscope, a magnetometer, a vibration sensor, an engine control module sensor, and/or other sensors.

Activity information may characterize operation of a vehicle and/or other aspects of the vehicle. For example, activity information may characterize actions performed by an operator of a vehicle. Activity information may describe a quantity and/or quality of an action performed by the operator and/or other information. For example, a quality of an action may include a definition of the action. A quantity of an action may include a value specifying a number of occurrences of the action. In some implementations, an action of an operator may include one or more of head movement, tightening and/or loosening of a grip on a steering wheel, motion of legs and/or feet, and/or other actions. In some implementations, one or more vehicle sensors 103 that may generate output signals conveying activity information may include one or more of an image sensor that characterizes a visual appearance of a person in the vehicle (e.g., generates information defining images and/or video of the operator), a sound sensor that characterizes a sound made by the operator, a biometric sensor coupled to the operator, and/or other sensors. By way of non-limiting illustration, images and/or video showing head movement of the operator may indicate a direction of turn and/or anticipated turn of the vehicle by the operator. By way of non-limiting illustration, tightening of a grip and/or increase in a heartrate may be indicative of an abrupt and/or evasive maneuver being performed and/or anticipated to be performed.

Trip progress information may characterize movement and/or context of a vehicle. For example, trip progress information may characterize a current trip taken by the vehicle. The trip may be characterized by one or more of a location of the vehicle along a trip, a distance traveled in a trip, a distance remaining in a trip, a duration traveled in a trip, and/or a remaining expected duration of a trip. Trip progress information may include information regarding a status of a trip, including specification of one or more of a location of a vehicle, a traveled distance, a remaining distance, a traveled duration, an expected remaining duration, and/or other trip progress information. In some implementations, one or more vehicle sensors 103 that may generate output signals conveying trip progress information may include one or more of a navigation sensor, a geolocation sensor, a magnetometer, a vehicle sensor, an engine control module sensor, and/or other sensors.

Environment information may characterize a context of a vehicle. The context of the vehicle may include a condition of an environment around a vehicle at a time, over a duration of time, at a location, and/or over a distance. The condition of an environment around a vehicle may include one or more of time, weather, temperature, humidity, lighting, terrain, nearby objects, state of nearby objects, nearby buildings, state of nearby buildings, and/or other environment information. In some implementations, terrain may include road terrain (e.g., speed bumps, dips, curves, and/or other terrain), environment terrain (e.g., desert, urban, rural, mountainous, etc.), and/or other features. Nearby objects may include one or more of people, animals, traffic lights, stop signs, and/or other objects. State of the nearby objects may describe the objects at a time, over a duration of time, at a location, and/or over a distance. By way of non-limiting illustration, a state of a traffic light may include a current color of the traffic light, the next color of the traffic light, the time it may take to change color, and/or other information. A state of a person may describe whether the person is standing, walking, running, waving, and/or other information. State of a nearby building may describe the building at a time, over a duration of time, at a location, and/or over a distance. By way of non-limiting illustration, a state of a nearby building may describe its current distance from a vehicle, an orientation of the building relative the vehicle, whether the building is under construction, and/or other information. In some implementations, one or more vehicle sensors 103 that may generate output signals conveying environment information may include one or more of a clock, an image sensor, a temperature sensor, a vibration sensor, a light detection sensor, an engine control module sensor, a ranging sensor, a GPS, a navigation system, and/or other sensors. In some implementations, environment information may be obtained one or more external resources 128. By way of non-limiting illustration, the one or more external sources 128 may include a source providing a map of an environment including locations of buildings and objects (e.g., Google® Maps) and/or other sources.

Caravanning information may characterize a context of a vehicle. For example, context of the vehicle may refer to one or more other vehicles at or near a vehicle. By way of non-limiting illustration, an other vehicle may be characterized by one or more of a relative position of the other vehicle relative to the vehicle at a time, over a duration of time, at a location, and/or over a distance. Caravanning information may include information regarding a position, an orientation, and/or speed of the vehicle and/or the other vehicle. In some implementations, one or more vehicle sensors 103 that may generate output signals conveying caravanning information may include one or more of an image sensor, a vehicle speed sensor, a wheel speed sensor, a motion sensor, an accelerometer, a tilt sensor, an inclination sensor, an angular rate sensor, a gyroscope, a navigation sensor, a geolocation sensor, a magnetometer, a radar detector, a radar sensor, a proximity sensor, a ranging sensor, a vehicle sensor, an engine control module sensor, and/or other sensors. In some implementations, caravanning information and/or other information may be obtained one or more external sources 128. By way of non-limiting illustration, the one or more external sources 128 may include other vehicles including sensors the same as or similar to one or more vehicle sensors 103. Such a configuration may facilitate a multi-vehicle shared experience. For example, multiple vehicles may implement system 100. The vehicles may exchange information. The multiple vehicles may be presented the same experience such that users of one vehicle may experience the same content as users in another vehicle. In some implementations, interactions of one vehicle may be reflected in the content presented to another vehicle.

The client device 102 may be configured to present content to a user of client device 102. Client device 102 may present content one or more of visually, audibly, haptically, and/or in other ways. Client device 102 may include one or more of one or more physical processors 120, one or more displays 122, one or more sensors 124, one or more input devices 126, and/or other components.

The one or more displays 122 may be configured to present visual content. Visual content may include content that may be observed visually. Visual content may include one or more of an image, a video, and/or other visual content. In some implementations, the visual content may include virtual content in the form of a simulated space (see, e.g., experience component 108). The one or more displays 122 may part of a wearable headset. The one or more displays 122 include one or more of a head-mounted display (HMD), an optical head-mounted display, a see-through display, an optical see-through display, a video see-through display, a visor, eyeglasses, sunglasses, a computer, a laptop, a smartphone, a tablet, a mobile device, a projector, and/or other displays. In some implementations, one or more displays 122 may include a set of displays that present visual content to each eye individually as stereo image pairs. In some implementations, one or more displays 122 may include other devices or components not worn by a user. For example, in an implementation, one or more displays 122 may include components integrated into a vehicle. For example, windows of a vehicle may include or may be replaced with transparent or opaque displays.

In some implementations, one or more sensors 124 may be configured to generate output signals conveying viewpoint information and/or other information. The viewpoint information may define a position and/or heading of client device 102. The position and/or heading of client device 102 may characterize a viewpoint of a user of client device 102. Heading may be specified with respect to one or more degrees of freedom. By way of non-limiting illustration, heading may specify one or more of a pitch angle, roll angle, yaw angle, and/or other information. For example, client device 102 may be installed on the head of a user such that as the user changes their viewpoint (e.g., turns their head), the position and/or heading of the client device 102 will similarly follow. The one or more sensors 124 may include one or more of a position sensor, a heading sensor, and/or other sensors. By way of non-limiting illustration, one or more sensors 124 may include one or more inertial measurement units (IMU) and/or other sensors.

One or more user inputs may be received through one or more input devices 126. By way of non-limiting example, an input device may include a key entry device, a touch entry device, an image device, a sound device, and/or other input devices.

A key entry device may include a device that allows a user to provide one or more user inputs by typing one or more of characters, numbers, and/or other symbols. A key entry device may include a separate device or a part of another device. For example, a key entry device may include a keyboard and/or other devices coupled to client device 102. As another example, a key entry device may include a mobile device coupled to client device 102. A user may provide one or more user inputs by typing information. For example, a user may provide one or more user inputs by typing one or more of a trip destination, a distance of a trip, a duration of a trip, a location along a trip, and/or other information relating to a trip.

A touch entry device may include a device that allows a user to provide user inputs by touching an interface of the touch entry device. A touch entry device may include a separate device or a part of another device. For example, a touch entry device may include a touch screen coupled to client device 102 and/or a vehicle. A user may provide one or more user inputs by touching one or more portions of the touch entry device. For example, a user may provide one or more user inputs by touching one or more portions of the touch entry device corresponding to one or more of a trip destination, a distance of a trip, a duration of a trip, a location along a trip, and/or other information relating to a trip.

An imaging device may include a device that allows a user to provide user inputs by using an image sensor of the imaging device. An imaging device may include a separate device or a part of another device. For example, an imaging device may include an image sensor coupled to client device 102 and/or a vehicle. A user may provide one or more user inputs by performing gestures within a field of view of the imaging device. The image sensor may generate output signals conveying image information. The image information may define one or more images. Images may be defined by pixels. Pixels may be characterized by one or more of pixel location, pixel color, and/or other information.

A sound device may include a device that allows a user to provide user inputs through voice and/or sounds. A sound device may include a separate device or part of another device. For example, a sound device may include a microphone coupled to client device 102 and/or a vehicle.

In FIG. 1, electronic storage 117 of one or more physical processors 104 may include electronic storage media that electronically stores information. The electronic storage 117 may store software algorithms, information determined by one or more physical processors 104, information received remotely, and/or other information that enables system 100 to function properly. For example, electronic storage 117 may store experience information, ride information, event and/or event type information, and/or other information.

The one or more physical processors 104 may be configured to provide information processing capabilities in system 100. As such, one or more physical processors 104 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The one or more physical processors 104 may be configured by machine-readable instructions 106. The machine-readable instructions 106 may include one or more computer program components. The computer program components may include one or more of an experience component 108, a synchronization component 110, a ride component 112, a prediction component 114, a trigger component 116, and/or other components.

The experience component 108 may be configured to obtain experience information and/or other information. The experience information may define visual content to be present to one or more users residing in a vehicle coupled to system 100. The visual content may be expressed through views of a virtual space. The experience component 108 may be configured to implement an instance of the interactive space (e.g., virtual space) executed by the computer components to determine state of the interactive space. The state may then be communicated (e.g., via streaming visual data, object/position data, and/or other state information) from one or more physical processors 104 to client device 102 for presentation to users. The state determined and transmitted to client device 102 may correspond to a viewpoint of a user of client device 102 (see, e.g., synchronization component 110). The state determined and presented to client device 102 may correspond to a location in the interactive space and/or viewpoint of the user. The view described by the state for client device 102 may correspond, for example, to the location from which the view is taken, the location the view depicts, and/or other locations, a zoom ratio, a dimensionality of objects, a point-of-view, and/or parameters of the view. One or more of the view parameters may be selectable by the users.

An instance of the interactive space may comprise a simulated space that is accessible by users via clients (e.g., client device 102) that present the views of the interactive space to a user. The simulated space may have a topography, express ongoing real-time interaction by one or more users, and/or include one or more virtual objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

In some implementations, the simulated space may be related to one or more of a real-world environment surrounding a vehicle, the vehicle itself, and/or parts of the vehicle. The simulated space may be related to the real-world environment surrounding the vehicle, the vehicle, and/or vehicle parts by virtue of the simulated space comprising a simulated version of the real-world environment surrounding the vehicle, the vehicle, and/or vehicle parts. The simulate version may be fantastical version, a realistic version, and/or other types of content.

The above description of the manner in which the state of the interactive space is determined by experience component 108 is not intended to be limiting. The experience component 108 may be configured to express the interactive space in a more limited, or richer, manner. For example, views determined for the interactive space representing the state of the instance of the interactive space may be selected from a limited set of graphics depicting an event in a given place within the interactive space. The views may include additional content (e.g., text, audio, pre-stored video content, and/or other content) that describes particulars of the current state of the place, beyond the relatively generic graphics. Other expressions of individual places within the interactive space are contemplated.

Within the instance(s) of the interactive space executed by experience component 108, users may control game entities, simulated physical phenomena (e.g., wind, rain, earthquakes, and/or other phenomena), and/or other elements within the interactive space to interact with the interactive space, other virtual objects, and/or other users. The game entities may include virtual characters such as avatars. As used herein, the term game entity may refer to a virtual object present in the interactive space that represents an individual user. A game entity may be controlled by the user with which it is associated. The user-controlled element(s) may move through and interact with the interactive space (e.g., non-user characters in the interactive space and/or other objects in the interactive space). The user-controlled elements controlled by and/or associated with a given user may be created and/or customized by the given user. The user may have an "inventory" of virtual items and/or currency that the user can use (e.g., by manipulation of a game entity or other user-controlled element, and/or other items) within the interactive space.

Control by users may be exercised through control inputs and/or commands input by the users through one or more input devices 126. The users may interact with each other through communications exchanged within the interactive space. Such communications may include one or more of textual chat, instant messages, private messages, voice communications, and/or other communications. Communications may be received and entered by the users. Communications may be routed to and from the appropriate users through one or more physical processors 104 and/or through communications which are external to the system 100 (e.g., text messaging services).

The instance of the interactive space may be persistent. That is, the interactive space may continue on whether or not individual user are currently logged in and/or participating in the interactive space. A user who logs out of the interactive space and then logs back in some time later may find the interactive space has been changed through the interactions of other users with the interactive space during the time the user was logged out. These changes may include changes to the simulated physical space, changes in the user's inventory, changes in other users' inventories, changes experienced by non-player characters, changes to the virtual items available for use in the interactive space, and/or other changes.

The experience component 108 may be configured to select content to present to a user to create the interactive space. The content of the interactive space may be associated with one or more experience types. The one or more experience types may include one or more of narrative-type experience for telling stories, game-type experiences for gameplay, and/or other types of experiences.

Content of a narrative type may generally follow a structure of a storytelling experience. For example, content of a narrative type may follow a storyline. The content of a narrative type experience may include one or more of introductory content (e.g., to introduce characters, a location, etc.), character development content, plot development content (e.g., a conflict, a plot twist, and/or a resolution), action content (e.g., characters carrying out objectives to accomplished the resolution), concluding content (e.g., meeting the resolution), and/or other content. It is noted that various types of storytelling structures and/or methodologies may be used for presenting content in a narrative style.

Content of a game type may be configured to elicit certain behaviors and/or actions from a user. For example, content of a game type may include objectives and/or goals which a user may attempt to complete through interaction with the content. For example, interaction may be facilitated by inputs via one or more input devices 126. The interactions may include controlling a user-controlled game entity and/or other interactions.

In some implementations, content may be selected by experience component 108 based on one or more of vehicle specifications, a trip criterion, a user selection, and/or other information. The experience component 108 may obtain information defining content based on the selection.

In some implementations, content may be selected based on vehicle specifications and/or other information. Vehicle specifications may refer to one or more parts of a vehicle. Vehicle specifications may provide an understanding of the construction, arrangement, spacing, and/or other aspects of parts of a vehicle. A part of a vehicle may refer to a single piece of a vehicle or multiple pieces of a vehicle that make up one or more sections of the vehicle. A part of a vehicle may be fixed or movable. A part of a vehicle may be installed in the vehicle at the time of manufacture or installed after the time of manufacture. By way of non-limiting example, vehicle parts may include one or more of an interior of the vehicle, an exterior of the vehicle, a seat, a headrest, a dash, a dashboard, a steering wheel, a gearstick, a gear knob, a glove compartment, a floorpan, a mat, an air vent, a navigation system, an entertainment system, a ceiling, an interior light, a moon roof, a tilt roof, a windshield, a side window, a rear window, a rear view mirror, a side view mirror, an arm rest, a front center console, a rear center console, a logo, a door, a door handle, a hood, a grille, a bumper, a fender, a headlight, a tail light, a wheel, a hubcap, a trunk lid, a tailgate, a roof, a side panel, a trailer, and/or another vehicle part of the vehicle.

In some implementations, content may be selected based on vehicle specification in that particular content may be associated with a particular vehicle and/or particular parts of a vehicle. Content may be associated with a vehicle by virtue of the content including simulated versions of the vehicle and/or vehicle parts. The content may be a simulated version of vehicle and/or vehicle parts in that the content or parts of the content may replicate the vehicle and/or vehicle parts. The simulate versions may be fantastical versions, realistic versions, and/or other types of content. For example, a vehicle part may include a window. Virtual content associated with the window may include an image of a porthole.

A trip criterion may refer to one or more physical and/or temporal characteristics of a trip. By way of non-limiting example, a trip criterion may include one or more of information relating to the trip destination, the distance of the trip, the duration of the trip, the locations along the trip and/or other information relating to the trip. A trip criterion may be obtained based on one or more user inputs received through one or more input devices, and/or from one or more navigation devices.

In some implementations, a trip criterion may be obtained based on user inputs received through one or more input devices 126. A user input may refer to information provided by a user through an input device. By way of non-limiting example, a user input may include information relating to trip criterion, and/or other information. One or more user inputs may be received through one or more input devices 126. By way of non-limiting example, an input device may include a key entry device, a touch entry device, and/or other input devices.

In some implementations, a trip criterion may be obtained from one or more navigation devices. A navigation device may refer to a device that keeps track of a location of a vehicle on a trip. For example, a navigation device may include a navigation/GPS system of a vehicle and/or a navigation/GPS system coupled to one or more physical processors 104.

In some implementations, experience component 108 may select content based on a trip destination and/or other information. A trip destination may refer to a destination on one or more parts of a trip. For example, experience component 108 may match a trip destination of a home to a content relating to an alien story of space travel to a home base, a home planet, and/or a home ship.

In some implementations, experience component 108 may select content based on a distance of a trip and/or other information. A distance of a trip may refer to a distance of one or more parts of a trip. For example, experience component 108 may select content that depicts traversal over a simulated space that has the same or similar distance as the trip.

In some implementations, experience component 108 may select content based on a duration of a trip and/or other information. A duration of a trip may refer to a duration of one or more parts of a trip. For example, experience component 108 may select content having a runtime that is the same as or similar to an anticipated duration of the trip.

In some implementations, experience component 108 may select content based on a location along a trip and/or other information. A location along a trip may refer to a location along one or more parts of a trip. For example, experience component 108 may select content portraying a particular location based on a location along a trip. For example, based on a trip taking place in a given city, experience component 108 may select content that is related to that city. By way of non-limiting illustration, a trip may take place in a modern city, and content selected by experience component 108 may include content related to a historical tour of that city (e.g., including images and/or video of a historical version of that city).

In some implementations, experience component 108 may select content based on a user selection and/or other information. A user selection may include a selection of one or more of the content itself, an experience type, and/or other selections.

The experience component 108 may be configured to effectuate presentation of content to a user via client device 102. By way of non-limiting illustration, experience component 108 may send commands, control signals, and/or other information to one or more displays 122.

The synchronization component 110 may be configured to determine a position and/or heading of client device 102. The position and/or heading of client device 102 may characterize a viewpoint of the user of client device 102. The position and/or heading may be determined based on output signals from one or more sensors 124.

The synchronization component 110 may be configured to synchronize the presentation of visual content on client device 102 based on the position and/or heading of client device 102 so that the presentation of the visual content changes as the viewpoint of the user changes. For example, synchronization component 110 may be configured to determine the state of the interactive space transmitted to client device 102 based on the position and/or heading of client device 102. In particular, the state of the interactive space may be determined so that the viewpoint within the simulated space matches, or substantially matches, the viewpoint of the user in the real-world. In this manner, presentation of content on client device 102 may provide a "window" for viewing into the simulated space.

The ride component 112 may be configured to obtain ride information and/or other information. The ride information may be obtained from output signals generated by one or more vehicle sensors 103 and/or other sources. The ride information may include one or more of motion information, activity information, trip progress information, environment information, caravanning information, and/or other ride information.

The prediction component 114 may be configured to predict events likely to occur based on the ride information and/or other information. Events likely to occur may include real-world events involving the vehicle and/or occurring at or near the vehicle. In some implementations, predicting events likely to occur may further include determining event type of the individual predicted events.

By way of non-limiting illustration, events may include one or more of a stopping event (e.g., the vehicle is coming to a stop or is stopped), an acceleration event (e.g., the vehicle accelerates), a turning event (e.g., the vehicle turns), a particular weather event (e.g., it is raining, sunny, cloudy, etc.), vertical movement event (e.g., hits a speed bump), a passing event (e.g., passing or being passed by one or more of an object, a building, another vehicle, etc.), and/or other events.

Event types may characterize events based on their expectancy of occurring. Event types may include one or more of expected-type events, unexpected-type events, and/or other event types. In general, expected-type events may allow for content adjustments to be pre-planned, while unexpected-type events may require content adjustment that are more reactive in nature.

Expected-type events may include events that may be predicted from ride information well in advance of any actual or predicted occurrence of the events. The term "well in advance" may refer to one or more of being at a beginning of a trip and/or a threshold time before a predicted occurrence (or actual occurrence) of the predicted event. A threshold time may be in the range of one or more of five to ten minutes, one to five minutes, ten to thirty seconds, one to five seconds, and/or other amount of time before a predicted (or actual) occurrence.

For example, an event of an expected-event type may be predicted to likely occur based on obtained motion information and/or other information. The motion information may convey a deceleration of vehicle. The event likely to occur may include a stop event, e.g., the vehicle may likely being coming to a stop based on the vehicle deceleration.

An event of an expected-event type may be predicted to likely occur based on obtained activity information and/or other information. The activity information may convey a movement of a vehicle operator's head in a first direction. The event likely to occur may include a turning event toward the first direction.

An event of an expected-event type may be predicted to likely occur based on obtained trip progress information and/or other information. The trip progress information may convey a particular location of the vehicle along a trip. The particular location may include, for example, a freeway onramp. The event likely to occur may include an acceleration event, e.g., the vehicle may likely start to accelerate to merge with freeway traffic.

An event of an expected-event type may be predicted to likely occur based on obtained environment information and/or other information. The environment information may convey a particular terrain is approaching on a road (e.g., a speed bump). The event likely to occur may include a vertical movement event, e.g., the vehicle may rise for a short period of time as it passes over the speed bump.

An event of an expected-event type may be predicted to likely occur based on obtained caravanning information and/or other information. The caravanning information may convey a relative position of an other vehicle approaching the position of the vehicle. The event likely to occur may include a passing event, e.g., the vehicle may likely be passing the other vehicle and/or may be passed by the other vehicle.

Unexpected-type events may include events that may be predicted from ride information within a short duration of any actual and/or predicted occurrence of the events. The term "short duration" may refer a threshold time before a predicted occurrence (or actual occurrence) of the predicted event. A threshold time may be in the range of one or more of five to ten seconds, three to five second, one to three second, one half to one second, 200 to 500 milliseconds, 100 to 200 milliseconds, ten to 100 milliseconds, one to ten milliseconds, and/or other amount of time before a predicted (or actual) occurrence.

For example, an event of an unexpected-event type may be predicted to likely occur based on obtained motion information, environment information, and/or other information. The environment information may convey a particular location of the vehicle being on a freeway. The motion information may convey a deceleration of vehicle. The event likely to occur may include a stopping event, e.g., the vehicle may likely be coming to a stop at a location (freeway) that is usually not known as a location for stopping and/or the stop may be in response to a sudden traffic event or obstacle.

An event of an unexpected-event type may be predicted to likely occur based on obtained activity information, and/or other information. The activity information may convey a sudden tightening of the operator's grip on the steering wheel. The event likely to occur may include a turning event and/or a stopping event, e.g., unexpected traffic and/or objects in the road may cause the operator to perform last-minute evasive maneuvers.

An event of an unexpected-event type may be predicted to likely occur based on obtained environment information and/or other information. The environment information may convey an object (such as a person) is approaching the vehicle. The event likely to occur may include a turning event and/or a stopping event, e.g., approaching object may cause the operator to perform last-minute evasive maneuvers to avoid hitting the object.

An event of an unexpected-event type may be predicted to likely occur based on obtained caravanning information and/or other information. The caravanning information may convey that a previously unknown vehicle is present and quickly approaching (appearing from around a blind corner, for example). The event likely to occur may include a passing event.

It is noted that the above descriptions of events, event types, and prediction of events are provided for illustrative purposes only and not to be considered limiting. For example, events may include one or more events within the scope of the disclosure but not explicitly listed herein. The events may be categorized into other types. The prediction of events may be carried out in other manners. For example, vehicles may include Advanced Driver Assistance Systems (ADAS) and/or others sensors allowing onboard processing to predict events in other ways.

The trigger component 116 may be configured to trigger adjustments to content (e.g., visual, audible, and/or haptic) at individual occurrences of individual predicted events. Triggering adjustments to visual content may include effectuating one or more of modifications, additions, and/or removal of content presented to the user. Adjustment may be directed to one or more of a particular virtual object and/or set of virtual objects, a topography of a simulated space, simulated physical phenomena, and/or other visual content.

In some implementations, one or more virtual objects present in views displayed to the user may be modified in that the one or more virtual objects may be perceived to react to the predicted events. By way of non-limiting illustration, a virtual object may be modified to perform a predetermined movement in response to a predicted event. By way of non-limiting illustration, a virtual object may be modified to orally respond to a predicted event. Other modifications are contemplated.

In some implementations, one or more virtual objects may be added to views of the interactive space in response to the predicted events. By way of non-limiting illustration, a virtual object may be introduced into a view of the interactive in response to a predicted event. Other additions of virtual objects are contemplated.

In some implementations, one or more virtual objects may be removed from views of the interactive space in response to the predicted events. By way of non-limiting illustration, a virtual object present in a view of the interactive space may be removed from the view in response to a predicted event.

Individual potential adjustments may be of individual adjustment types. The adjustment types may include expected-type adjustments, unexpected-type adjustments, and/or other adjustment types. Adjustment types of the adjustments may correspond to event types of the predicted events. In some implementations, an individual adjustment may correspond to an individual event regardless of event type.

By way of non-limiting illustration, adjustments of an expected-type may include modifications, additions, and/or removal of content that may be triggered based on expected-type events being predicted. Adjustments of an unexpected-type may include modifications, additions, and/or removal of content that may be triggered based on unexpected-type events being predicted. In some implementations, adjustments of the expected-type may be incorporated or integrated into a narrative of a story as expectancy of occurrence of expected-type events may allow these adjustments to be preplanned. For example, if a trip includes a known stop sign location, the stopping event at that stop sign can be predicted well in advance of the event occurring. Accordingly, an adjustment to a story can be provided at the occurrence of that stopping event, and the adjustment may be an integral part of the narrative of the storyline (e.g., a climax, a plot twist, a character introduction, etc.). In some implementations, adjustments of the unexpected-type may be incidental or "one-off" adjustments as the expectancy of occurrence of unexpected-type events may not be preplanned well in advance. For example, adjustments of the unexpected-type may be reactive in nature and may or may integrate into a narrative.

In some implementations, individual aspects of virtual content in the interactive space may be associated with individual sets of potential adjustments. Aspects of the virtual content may refer to individual virtual objects, scenes (e.g., including certain arrangements of virtual objects, parts of a storyline, and/or other considerations), a certain point in time along the progress of a game, and/or other aspects. Depending on a state of the interactive space (e.g., what aspects are currently present) at the time of a predicted event, an individual adjustment may be selected from a set of potential adjustments. The selection may be based on the specific predicted event, the event type of the predicted event, and/or other information. For example, a first virtual object may be associated with a first set of potential adjustments. The first set of potential adjustments may include one or more of a first adjustment, a second adjustment, third adjustment, and/or other adjustments. The first adjustment may be of an unexpected type and may be selected if an event of an unexpected type is predicted while the first virtual object is present in a view of the interactive space. The second adjustment may be of an expected type and may be selected if an event of an expected type is predicted while the first virtual object is present in a view of the interactive space. The third adjustment be selected if a specific event is predicted while the first virtual object is present in a view of the interactive space, regardless of event type.

The trigger component 116 may be configured to queue sets of potential adjustments and select one or more of the potential adjustments to trigger based on the predicted events and/or event types of the predicted events. The trigger component 116 may be configured to trigger the individual adjustments at individual occurrences of the individual predicted events.

In some implementations, individual occurrences of individual predicted events may include one or more of predicted occurrences of the predicted events and/or actual occurrences of the predicted events. Accordingly, trigger component 116 may be configured to determine, based on the ride information, the actual occurrences of the predicted events. By way of non-limiting illustration, ride information conveying a deceleration of a vehicle may predict an occurrence of a stopping event, while ride information conveying the vehicle is no longer in motion may indicate an actual occurrence of the stopping event.

Triggering adjustments at individual occurrences of individual predicted events may include triggering prior to the occurrences (actual or predicted), at a start of the occurrences (actual or predicted), and/or at a time following the occurrences (actual or predicted).

Figure 3:
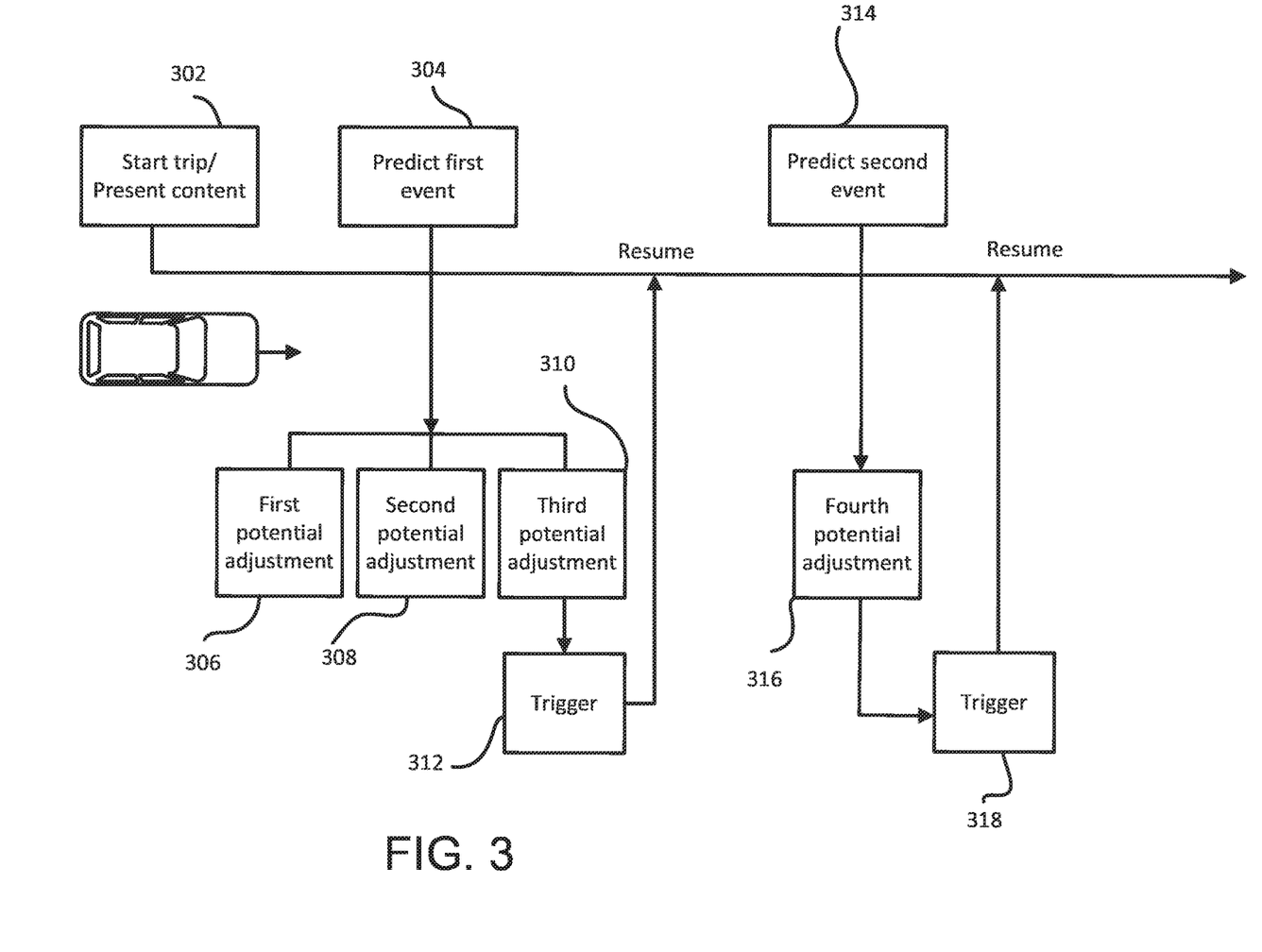
FIG. 3 illustrates a flow chart of an implementation of providing an interactive space based on predicted events.

FIG. 3 illustrates a flow chart of an implementation of providing an interactive space based on predicted event. A trip may start 302 and content may be selected and presented to a user. The content may correspond to, for example, a narrative-type experience and may include a story. At a subsequent point in time, a first event may be predicted 304. A set of potential adjustments may be queued for selection and triggering. The set of adjustments may include one or more of a first potential adjustment 306, a second potential adjustment 308, a third potential adjustment 310, and/or other potential adjustments. At least one of the potential adjustments may be selected based on one or more of the first event, the event type of the first event, and/or other information. For example, the third potential adjustment 310 may be selected and triggered 312 based on one or more of the first event, the event type of the first event, and/or other information. The trip may resume. At a subsequent point in time, a second event may be predicted 314. A set of potential adjustments may be queued for selection and triggering. The set of adjustments may include a fourth potential adjustment 316 and/or other potential adjustments. The fourth potential adjustment 316 may correspond to the second event predicted at 314. The fourth potential adjustment 316 may be selected and triggered 318 based on the second event and/or other information. The trip may resume.

Figure 4:
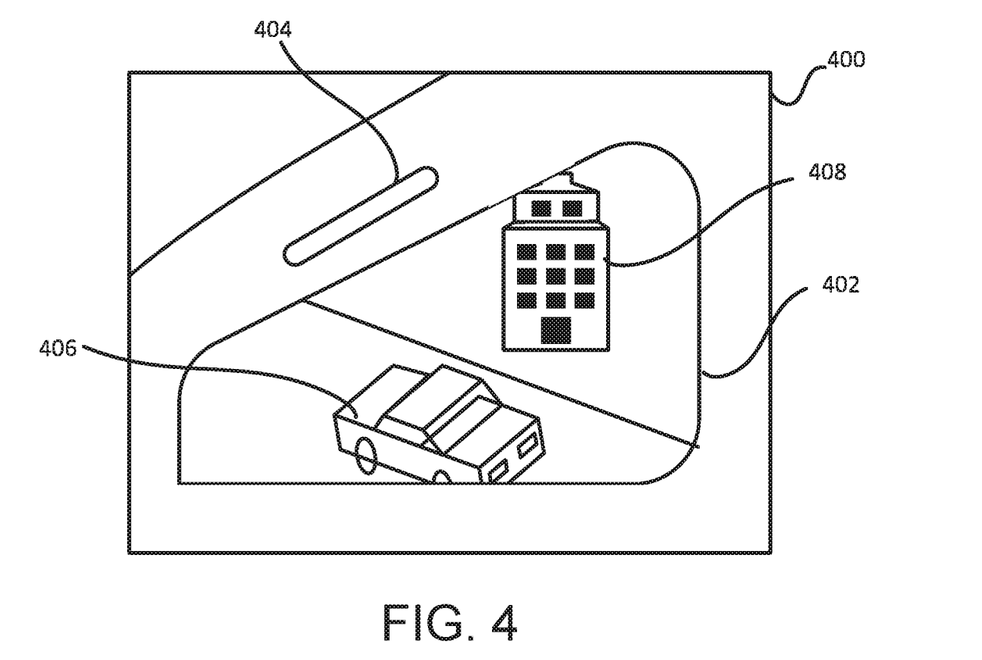
FIG. 4 shows a view of a real-world environment from the perspective of a user in a vehicle coupled to the system of FIG. 1.

FIG. 4 shows a view 400 of a real-world environment from the perspective of a passenger in a vehicle coupled to the system of FIG. 1. For example, the view shows a window 402 of a vehicle as viewed by a front passenger of the vehicle. The vehicle may include vehicle parts, such as handle part 404, arranged as a grab handle for the front passenger. Within the view through window 402, one or more real-world objects may be seen. For example, a building 408 and a vehicle 406 are shown as being visible through window 402.

Figure 5:
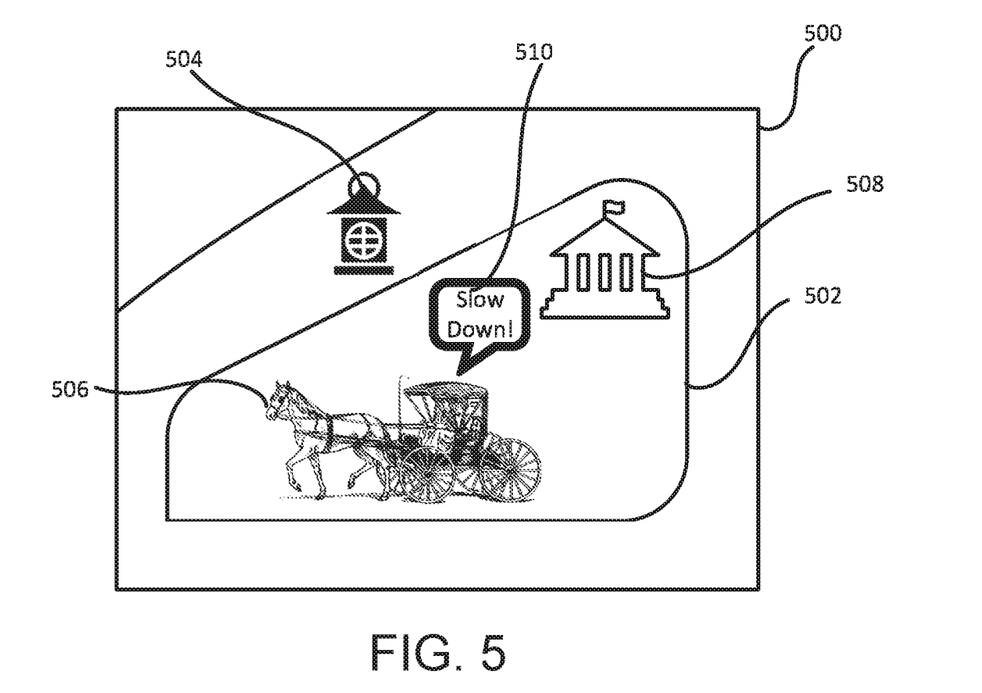
FIG. 5 shows a view of an interactive space from the perspective of FIG. 4.

FIG. 5 shows a view 500 of an interactive space from the perspective of FIG. 4. For example, the front passenger of FIG. 4 may utilize a client device such as client device 102 of FIG. 1. The content presented to the user include images of virtual objects. The virtual objects may be related to the real-world objects within the environment and the vehicle parts. For example, the virtual objects may include a simulated horse and buggy 506 presented to take the place of vehicle 406 presented in the real world. The virtual objects may include a virtual building 508 present to take the place of building 408 present in the real-world. The virtual objects may include a virtual window 502 presented to take the place of real window 402. The virtual objects may include a virtual lantern 504 presented to take the place of handle part 404 present in the vehicle. The content may be associated with a narrative, such as a historical storytelling of the city the vehicle may be present in. Predicted events may cause adjustments to the content to be triggered. For example, the passing of the vehicle 406 (FIG. 4) may cause the virtual counterpart, e.g., the horse and buggy 506, to react to the passing event. For example, the operator of horse and buggy 506 may verbally react, shown by speech bubble 510.

It is noted that the depictions and corresponding descriptions for FIG. 4 and FIG. 5 are for illustrative purposes only and are not to be considered limiting. For example, virtual objects may be expressed in other ways, an experience may include gameplay and/or narratives, and/or other changes may be made within the scope of this disclosure.

By way of non-limiting illustration, a simulated space may comprise a virtual world and/or scenes/sets of a movie. The world and/or objects present in the world may or may not be mapped on physical objects or locations (taking the place of buildings, corners at stop lights, tunnels, etc.). As the real-world vehicle including the system of FIG. 1 travels down a road, the speed and vehicle maneuvers may be predicted. As another real-world vehicle approaches the vehicle, content may be presented and/or adjustments may be triggered. For example, a virtual equivalent (e.g., a character in the movie) may appear to the user as driving up beside the vehicle, passing the vehicle, talking to the user, changing speed or direction as the other vehicle changes speed or direction, and/or other content adjustments may be made. In general, it may be intended that predictive motion may cause content and/or content adjustments to be queued and a solution of reason triggered for the prediction.

By way of non-limiting illustration, environmental lighting queues may change with vehicle direction. Accordingly, adjustments to content may be made. This may include simulating "god rays" coming in the car, or shadows in the car, which can change direction if the vehicle turns based on the location of a simulated point source.

By way of non-limiting illustration, if a vehicle experiences a motion caused by a bump, audible content may be provided as if coming from behind the vehicle, and visual content may be presented in a virtual rear-view mirror showing an animated character being "hit" and yelling "watch where you're going!"

By way of non-limiting illustration, a slow down or stop event may be predicted, and virtual content may be presented that simulates a car pulling out in front or a herd of cattle running onto the road that causes the vehicle to stop.

Returning to FIG. 1, although one or more physical processors 104, one or more vehicle sensors 103, client device 102, electronic storage 117, and external resource(s) 128, are shown to be connected to network(s) 118 in FIG. 1, any communication medium may be used to facilitate interaction between any components of system 100. One or more components of system 100 may communicate through hard-wired communication, wireless communication, or both. For example, one or more physical processors 104 may wirelessly communicate with one or more vehicle sensors 103 and/or client device 102. Wireless communication may include one or more of radio communication, Bluetooth communication, Wi-Fi communication, cellular communication, infrared communication, or other wireless communication. In some implementations, one or more physical processor 120 of client device may include the same or similar machine-readable instructions as machine-readable instructions 106 of one or more physical processors 104.

Although one or more physical processors 104 is/are shown in FIG. 1 as a single entity, this is for illustrative purposes only. In some implementations, one or more physical processors 104 may comprise a plurality of processing units. These processing units may be physically located within the same device, or one or more physical processors 104 may represent processing functionality of a plurality of devices operating in coordination.

One or more physical processors 104 may be configured to execute one or more of components 108, 110, 112, 114, 116, and/or other components by software; hardware; firmware; some combination of software, hardware, and/or firmware; and/or other mechanisms for configuring processing capabilities on one or more physical processors 104.

Although components 108, 110, 112, 114, and/or 116 are illustrated in FIG. 1 as being co-located within a single processing unit, in implementations in which one or more physical processors 104 comprises multiple processing units, one or more of 108, 110, 112, 114, and/or 116 may be located remotely from the other computer program components.

The description of the functionality provided by the different computer program components 108, 110, 112, 114, and/or 116 is for illustrative purposes, and is not intended to be limiting, as any of computer program components 108, 110, 112, 114, and/or 116 may provide more or less functionality than is described. For example, one or more of computer program components 108, 110, 112, 114, and/or 116 may be eliminated, and some or all of its functionality may be provided by other computer program components 108, 110, 112, 114, and/or 116. As another example, one or more physical processors 104 may be configured to execute one or more additional computer program components that may perform some or all of the functionality attributed to one or more of computer program components 108, 110, 112, 114, and/or 116.

The electronic storage media of electronic storage 117 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 117 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 117 may be a separate component within system 100, or electronic storage 117 may be provided integrally with one or more other components of system 100 (e.g., one or more physical processors 104). Although electronic storage 117 is shown in FIG. 1 as a single entity, this is for illustrative purposes only. In some implementations, electronic storage 117 may comprise a plurality of storage units. These storage units may be physically located within the same device, or electronic storage 117 may represent storage functionality of a plurality of devices operating in coordination.

The external resource(s) 128 may include sources of information, hosts, external entities participating with system 100, providers of virtual content, and/or other resources. In some implementations, some or all of the functionality attributed herein to external resource(s) 128 may be provided by resources included in system 100.

Figure 2:
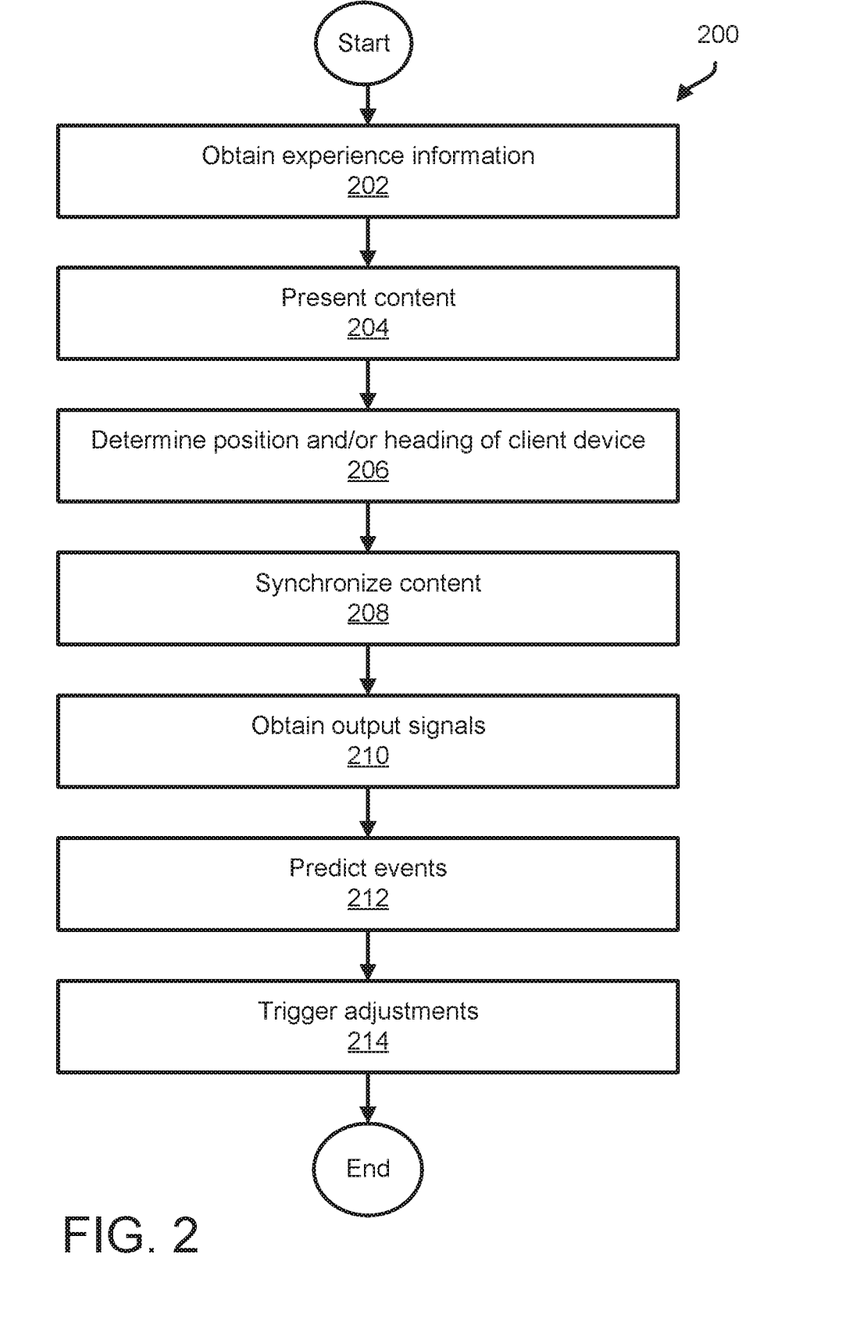
FIG. 2 illustrates a method to provide an interactive space based on predicted events, in accordance with one or more implementations.

FIG. 2 illustrates method 200 of providing an interactive space based on predicted events. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 202, experience information may be obtained. The experience information may define visual content to be presented to a user residing in the vehicle to create an interactive space. In some implementations, operation 202 may be performed by a processor component the same as or similar to experience component 108 (shown in FIG. 1 and described herein).

At operation 204, presentation may be effectuated of the visual content on a client device configured to be installed on a head of the user. In some implementations, operation 204 may be performed by a processor component the same as or similar to experience component 108 (shown in FIG. 1 and described herein).

At operation 206, a position and/or heading of the client device may be determined. The position and/or heading of the client device may characterize a viewpoint of the user of the client device. In some implementations, operation 206 may be performed by a processor component the same as or similar to synchronization component 110 (shown in FIG. 1 and described herein).

At operation 208, the presentation of the visual content on the client device may be synchronized based on the position and/or heading of the client device. The synchronization may cause the presentation of the visual content to change as the viewpoint of the user change. In some implementations, operation 208 may be performed by a processor component the same as or similar to synchronization component 110 (shown in FIG. 1 and described herein).

At operation 210, output signals generated by a set of sensors coupled to the vehicle may be obtained. The output signals may convey ride information and/or other information. The ride information may characterize one or more of movement, operation, and/or context of the vehicle. In some implementations, operation 210 may be performed by a processor component the same as or similar to ride component 112 (shown in FIG. 1 and described herein).

At operation 212, events likely to occur may be predicted based on the ride information and/or other information. In some implementations, operation 212 may be performed by a processor component the same as or similar to prediction component 114 (shown in FIG. 1 and described herein).

At operation 214, adjustments to the visual content may be triggered at individual occurrences of individual predicted events. In some implementations, operation 214 may be performed by a processor component the same as or similar to trigger component 116 (shown in FIG. 1 and described herein).

Although the system(s) and/or method(s) of this disclosure have been described in detail for the purpose of illustration based on what is currently considered to be the most practical and preferred implementations, such detail is solely for that purpose and that the disclosure is not limited to the disclosed implementations, but, on the contrary, is intended to cover modifications and equivalent arrangements that are within the spirit and scope of the appended claims. The present disclosure contemplates that, to the extent possible, one or more features of any implementation can be combined with one or more features of any other implementation.

What is claimed is:

1. A system configured to provide an interactive space based on predicted events, the system being coupled to a vehicle, the system comprising:

one or more physical processors configured by machine readable instructions to:

obtain experience information, the experience information defining visual content to be presented to a user residing in the vehicle to create an interactive space, the visual content including a simulated space and one or more virtual objects present in the simulated space, the one or more virtual objects including a first virtual object;

effectuate presentation of the visual content on a client device configured to be installed on a head of the user;

determine a position and/or heading of the client device, the position and/or heading of the client device characterizing a viewpoint of the user of the client device;

synchronize the presentation of the visual content on the client device based on the position and/or heading of the client device so that the presentation of the visual content changes as the viewpoint of the user changes;

obtain output signals generated by a set of sensors coupled to the vehicle, the output signals conveying ride information, the ride information characterizing movement, operation, context, or a combination thereof of the vehicle;

obtain individual sets of potential adjustments to make to the visual content, individual potential adjustments being associated with individual event types of individual predicted events, such that a first set of potential adjustments associated with the first virtual object is obtained, the first set of potential adjustments including a first potential adjustment to the first virtual object and a second potential adjustment to the first virtual object, the first potential adjustment being associated with a first event type, and the second potential adjustment being associated with a second event type;

predict events likely to occur based on the ride information;

determine event type of the individual predicted events;

select one or more potential adjustments from the individual sets of potential adjustments based on the event type of the individual predicted events; and trigger selected ones of the one or more potential adjustments to the visual content currently within a view being presented to the user at individual occurrences of the individual predicted events, such that:

responsive to the first virtual object currently being within the view and an occurrence of a first predicted event of the first event type, the first potential adjustment to the first virtual object is selected and triggered; and responsive to the first virtual object currently being within the view and an occurrence of a second predicted event of the second type, the second potential adjustment to the first virtual object is selected and triggered.

2. The system of claim 1, wherein the individual potential adjustments correspond to specific event types and/or specific predicted events.

3. The system of claim 1, wherein the individual occurrences of individual predicted events are predicted occurrences of the predicted events.

4. The system of claim 1, wherein the individual occurrences of individual predicted events are actual occurrences of the predicted events.

5. The system of claim 1, wherein the client device is a head-mounted display.

6. The system of claim 1, wherein the ride information includes motion information, activity information, trip progress information, environment information, caravanning information, or a combination thereof.

7. The system of claim 1, wherein the visual content is related to a story or a game.

8. The system of claim 1, wherein the interactive space is a virtual reality environment.

9. A method to provide an interactive space based on predicted events, the method being implemented in a system coupled to a vehicle, the method comprising:

obtaining experience information, the experience information defining visual content to be presented to a user residing in the vehicle to create an interactive space, the visual content including a simulated space and one or more virtual objects present in the simulated space, the one or more virtual objects including a first virtual object;

effectuating presentation of the visual content on a client device configured to be installed on a head of the user;

determining a position and/or heading of the client device, the position and/or heading of the client device characterizing a viewpoint of the user of the client device;

synchronizing the presentation of the visual content on the client device based on the position and/or heading of the client device so that the presentation of the visual content changes as the viewpoint of the user changes;

obtaining output signals generated by a set of sensors coupled to the vehicle, the output signals conveying ride information, the ride information characterizing movement, operation, context, or a combination thereof of the vehicle;

obtaining individual sets of potential adjustments to make to the visual content, individual potential adjustments being associated with individual event types of individual predicted events, including obtaining a first set of potential adjustments associated with the first virtual object, the first set of potential adjustments including a first potential adjustment to the first virtual object and a second potential adjustment to the first virtual object, the first potential adjustment being associated with a first event type, and the second potential adjustment being associated with a second event type;

predicting events likely to occur based on the ride information;

determining event type of the individual predicted events;

selecting one or more potential adjustments from the individual sets of potential adjustments based on the event type of the individual predicted events; and triggering selected ones of the one or more potential adjustments to the visual content currently within a view being presented to the user at individual occurrences of individual predicted events, including:

responsive to the first virtual object currently being within the view and an occurrence of a first predicted event of the first event type, selecting and triggering the first potential adjustment to the first virtual object; and responsive to the first virtual object currently being within the view and an occurrence of a second predicted event of the second type, selecting and triggering the second potential adjustment to the first virtual object.

10. The method of claim 1, wherein the individual potential adjustments correspond to specific event types and/or specific predicted events.

11. The method of claim 9, wherein the individual occurrences of individual predicted events are predicted occurrences of the predicted events.

12. The method of claim 1, wherein the individual occurrences of individual predicted events are actual occurrences of the predicted events.

13. The method of claim 9, wherein the client device is a head-mounted display.

14. The method of claim 9, wherein the ride information includes motion information, activity information, trip progress information, environment information, caravanning information, or a combination thereof.

15. The method of claim 9, wherein the visual content is related to a story or a game.

16. The method of claim 9, wherein the interactive space is a virtual reality environment.

17. A system configured to provide an interactive space based on predicted events, the system being coupled to a vehicle, the system comprising:

one or more physical processors configured by machine readable instructions to:

obtain experience information, the experience information defining visual content to be presented to a user residing in the vehicle to create an interactive space;

effectuate presentation of the visual content on a client device configured to be installed on a head of the user;

determine a position and/or heading of the client device, the position and/or heading of the client device characterizing a viewpoint of the user of the client device;

synchronize the presentation of the visual content on the client device based on the position and/or heading of the client device so that the presentation of the visual content changes as the viewpoint of the user changes;

obtain output signals generated by a set of sensors coupled to the vehicle, the set of sensors including an engine control module sensor, the output signals conveying ride information, the ride information characterizing movement, operation, and/or context of the vehicle as determined from the output signals from at least the engine control module sensor;

predict events likely to occur based on the ride information characterizing the movement, the operation, and/or the context of the vehicle as determined from the output signals from at least the engine control module sensor; and trigger adjustments to the visual content at anticipated occurrences of individual predicted events.

* * * * *